US007225231B2

(12) United States Patent  
Mendez et al.

(10) Patent No.: US 7,225,231 B2
(45) Date of Patent: May 29, 2007

(54) SYSTEM AND METHOD FOR TRANSMITTING WORKSPACE ELEMENTS ACROSS A NETWORK

(75) Inventors: Daniel J. Mendez, Mountain View, CA (US); Mark D. Riggins, San Jose, CA (US); Prasad Wagle, Santa Clara, CA (US); Christine C. Ying, Foster City, CA (US)

(73) Assignee: Visto Corporation, Redwood Shores, CA (US)

( * ) Notice: Subject to any disclaimer, the term of this patent is extended or adjusted under 35 U.S.C. 154(b) by 289 days.

(21) Appl. No.: 09/921,228

(22) Filed: Aug. 1, 2001

(65) Prior Publication Data

US 2002/0035618 A1   Mar. 21, 2002

Related U.S. Application Data

(63) Continuation of application No. 09/666,877, filed on Sep. 20, 2000, now Pat. No. 6,708,221.

(51) Int. Cl.
*G06F 13/00* (2006.01)
(52) U.S. Cl. .................................................. 709/206
(58) Field of Classification Search ................ 709/248, 709/204, 205, 206, 203; 707/202, 203, 204; 711/161, 162
See application file for complete search history.

(56) References Cited

U.S. PATENT DOCUMENTS 4,652,698 A   3/1987  Hale et al.
4,714,995 A   12/1987 Materna et al.
4,831,582 A   5/1989  Miller et al.
4,875,159 A   10/1989 Cary et al.
4,882,752 A   11/1989 Lindman et al.
4,897,781 A   1/1990  Chang et al.
4,916,738 A   4/1990  Chandra et al.
5,048,085 A   9/1991  Abraham et al.
5,150,407 A   9/1992  Chan (Continued)

FOREIGN PATENT DOCUMENTS

CA   CA 2191505   6/1997
CA   CA 2210763   1/1999

(Continued)

OTHER PUBLICATIONS

Emmett Gray, "FETCH-O-MATIC by Emmett Gray", http://www.filmscouts.com/software/fomguide.asp, Version 2.5, 2001.*

(Continued)

*Primary Examiner*—Robert B. Harrell
(74) *Attorney, Agent, or Firm*—Oblon, Spivak, McClelland, Maier & Neustadt, P.C.

(57) ABSTRACT

A system transmits new workspace elements or new workspace element changes at a first memory store via an electronic network to a second memory store. The system includes a first memory store for storing workspace elements; a second memory store coupled via an electronic network to the first memory store for storing workspace element copies; an interface for receiving new workspace elements at the first memory store; and a general synchronization module for electronically transmitting copies of the new workspace elements via the electronic network to the second memory store.

6 Claims, 5 Drawing Sheets

U.S. PATENT DOCUMENTS

| | | |
|---|---|---|
| 5,220,603 A | 6/1993 | Parker |
| 5,263,157 A | 11/1993 | Janis |
| 5,265,159 A | 11/1993 | Kung |
| 5,333,266 A * | 7/1994 | Boaz et al. .................. 709/206 |
| 5,386,564 A | 1/1995 | Shearer et al. |
| 5,388,255 A | 2/1995 | Pytlik et al. |
| 5,392,390 A | 2/1995 | Crozier |
| 5,420,927 A | 5/1995 | Micali |
| 5,425,102 A | 6/1995 | Moy |
| 5,434,918 A | 7/1995 | Kung et al. |
| 5,483,596 A | 1/1996 | Rosenow et al. |
| 5,491,752 A | 2/1996 | Kaufman et al. |
| 5,495,533 A | 2/1996 | Linehan et al. |
| 5,510,777 A | 4/1996 | Pilc et al. |
| 5,544,320 A | 8/1996 | Konrad |
| 5,544,322 A | 8/1996 | Cheng et al. |
| 5,572,643 A | 11/1996 | Judson |
| 5,581,749 A | 12/1996 | Hossain et al. |
| 5,588,132 A | 12/1996 | Cardoza |
| 5,600,834 A | 2/1997 | Howard |
| 5,604,788 A | 2/1997 | Tett |
| 5,613,012 A | 3/1997 | Hoffman et al. |
| 5,623,601 A | 4/1997 | Vu |
| 5,627,658 A | 5/1997 | Connors et al. |
| 5,627,997 A | 5/1997 | Bray et al. |
| 5,632,011 A | 5/1997 | Landfield et al. |
| 5,634,053 A | 5/1997 | Noble et al. |
| 5,644,354 A | 7/1997 | Thompson et al. |
| 5,647,002 A | 7/1997 | Brunson |
| 5,652,884 A | 7/1997 | Palevich |
| 5,657,390 A | 8/1997 | Elgamal et al. |
| 5,664,207 A | 9/1997 | Crumpler et al. |
| 5,666,530 A * | 9/1997 | Clark et al. .................. 707/201 |
| 5,666,553 A | 9/1997 | Crozier |
| 5,675,782 A | 10/1997 | Montague et al. |
| 5,678,039 A | 10/1997 | Hinks et al. |
| 5,680,542 A | 10/1997 | Mulchandani et al. |
| 5,682,478 A | 10/1997 | Watson et al. |
| 5,682,524 A | 10/1997 | Freund et al. |
| 5,684,951 A | 11/1997 | Goldman et al. |
| 5,684,984 A | 11/1997 | Jones et al. |
| 5,684,990 A | 11/1997 | Boothby |
| 5,687,322 A | 11/1997 | Deaton et al. |
| 5,701,400 A | 12/1997 | Amado |
| 5,701,423 A | 12/1997 | Crozier |
| 5,706,427 A | 1/1998 | Tabuki |
| 5,706,502 A | 1/1998 | Foley et al. |
| 5,710,918 A | 1/1998 | Lagarde et al. |
| 5,710,922 A | 1/1998 | Alley et al. |
| 5,713,019 A | 1/1998 | Keaten |
| 5,715,403 A | 2/1998 | Stefik |
| 5,717,925 A | 2/1998 | Harper et al. |
| 5,721,779 A | 2/1998 | Funk |
| 5,721,908 A | 2/1998 | Lagarde et al. |
| 5,721,914 A | 2/1998 | DeVries |
| 5,727,202 A | 3/1998 | Kucala |
| 5,729,735 A | 3/1998 | Meyering |
| 5,742,668 A | 4/1998 | Pepe et al. |
| 5,745,360 A | 4/1998 | Leone et al. |
| 5,752,059 A | 5/1998 | Holleran et al. |
| 5,752,246 A | 5/1998 | Rogers et al. |
| 5,754,830 A | 5/1998 | Butts et al. |
| 5,757,916 A | 5/1998 | MacDoran et al. |
| 5,758,150 A | 5/1998 | Bell et al. |
| 5,758,354 A | 5/1998 | Huang et al. |
| 5,758,355 A | 5/1998 | Buchanan |
| 5,764,902 A | 6/1998 | Rothrock |
| 5,765,171 A | 6/1998 | Gehani et al. |
| 5,768,510 A | 6/1998 | Gish |
| 5,778,346 A | 7/1998 | Frid-Nielsen et al. |
| 5,778,389 A * | 7/1998 | Pruett et al. .................. 707/204 |
| 5,784,463 A | 7/1998 | Chen et al. |
| 5,784,464 A | 7/1998 | Akiyama et al. |
| 5,787,172 A | 7/1998 | Arnold |
| 5,790,425 A | 8/1998 | Wagle |
| 5,790,790 A | 8/1998 | Smith et al. |
| 5,790,974 A | 8/1998 | Tognazzini |
| 5,794,252 A | 8/1998 | Mosher |
| 5,799,086 A | 8/1998 | Sudia |
| 5,799,318 A | 8/1998 | Cardinal et al. |
| 5,802,530 A | 9/1998 | Van Hoff |
| 5,812,398 A | 9/1998 | Nielsen |
| 5,812,668 A | 9/1998 | Weber |
| 5,812,773 A | 9/1998 | Norin |
| 5,815,683 A | 9/1998 | Vogler |
| 5,818,935 A | 10/1998 | Maa |
| 5,828,840 A | 10/1998 | Cowan et al. |
| 5,832,483 A | 11/1998 | Barker |
| 5,835,087 A | 11/1998 | Herz et al. |
| 5,835,601 A | 11/1998 | Shimbo et al. |
| 5,845,282 A | 12/1998 | Alley et al. |
| 5,862,325 A | 1/1999 | Reed et al. |
| 5,862,346 A | 1/1999 | Kley et al. |
| 5,870,544 A | 2/1999 | Curtis |
| 5,870,759 A | 2/1999 | Bauer et al. |
| 5,870,765 A | 2/1999 | Bauer et al. |
| 5,878,230 A | 3/1999 | Weber et al. |
| 5,909,689 A | 6/1999 | Van Ryzin |
| 5,924,103 A | 7/1999 | Ahmed et al. |
| 5,928,329 A | 7/1999 | Clark et al. |
| 5,943,676 A | 8/1999 | Boothby |
| 5,951,652 A | 9/1999 | Ingrassia, Jr. et al. |
| 5,961,590 A | 10/1999 | Mendez et al. |
| 5,966,714 A | 10/1999 | Huang et al. |
| 5,968,131 A | 10/1999 | Mendez et al. |
| 5,974,238 A * | 10/1999 | Chase, Jr. .................. 709/248 |
| 5,982,898 A | 11/1999 | Hsu et al. |
| 5,987,609 A | 11/1999 | Hasebe |
| 5,999,932 A | 12/1999 | Paul |
| 5,999,947 A | 12/1999 | Zollinger et al. |
| 6,006,017 A | 12/1999 | Joshi et al. |
| 6,006,274 A * | 12/1999 | Hawkins et al. ............ 709/248 |
| 6,020,885 A | 2/2000 | Honda |
| 6,021,427 A | 2/2000 | Spagna et al. |
| 6,023,700 A | 2/2000 | Owens et al. |
| 6,023,708 A | 2/2000 | Mendez et al. |
| 6,034,621 A | 3/2000 | Kaufman |
| 6,052,735 A | 4/2000 | Ulrich et al. |
| 6,073,165 A | 6/2000 | Narasimhan et al. |
| 6,085,192 A * | 7/2000 | Mendez et al. ............... 707/10 |
| 6,094,477 A | 7/2000 | Nada et al. |
| 6,125,281 A | 7/2000 | Wells et al. |
| 6,108,691 A | 8/2000 | Lee et al. |
| 6,108,709 A | 8/2000 | Shinomura et al. |
| 6,118,856 A | 9/2000 | Paarsmarkt et al. |
| 6,131,096 A | 10/2000 | Ng et al. |
| 6,131,116 A | 10/2000 | Riggins et al. |
| 6,138,146 A | 10/2000 | Moon et al. |
| 6,151,606 A | 11/2000 | Mendez |
| 6,154,844 A | 11/2000 | Touboul et al. |
| 6,169,986 B1 | 1/2001 | Bowman et al. |
| 6,182,118 B1 | 1/2001 | Finney et al. |
| 6,212,529 B1 | 4/2001 | Boothby et al. |
| 6,249,805 B1 | 6/2001 | Fleming, III |
| 6,295,541 B1 | 9/2001 | Bodnar et al. |
| 6,304,881 B1 | 10/2001 | Halim et al. |
| 6,311,186 B1 | 10/2001 | Melampy et al. |
| 6,324,542 B1 | 11/2001 | Wright, Jr. et al. |
| 6,334,140 B1 | 12/2001 | Kawamata |
| 6,343,313 B1 | 1/2002 | Salesky et al. |
| 6,389,455 B1 | 5/2002 | Fuisz |
| 6,438,583 B1 | 8/2002 | McDowell et al. |
| 6,446,090 B1 | 9/2002 | Hart |
| 6,477,545 B1 | 11/2002 | LaRue |

| | | | |
|---|---|---|---|
| 6,510,455 B1 | 1/2003 | Chen et al. | |
| 6,564,218 B1 | 5/2003 | Roth | |
| 6,631,416 B2 | 10/2003 | Bendinelli et al. | |
| 6,697,942 B1 | 2/2004 | L'Heureux et al. | |

FOREIGN PATENT DOCUMENTS

| | | |
|---|---|---|
| CA | 2210763 | 2/2000 |
| EP | 0 801 478 | 10/1997 |
| EP | EP 0801478 | 10/1997 |
| EP | EP 0820028 | 1/1998 |
| JP | JP 02000003314 | 1/2000 |
| WO | WO 96/17306 | 6/1996 |
| WO | WO 97/04389 | 2/1997 |
| WO | WO 97/24678 | 7/1997 |
| WO | WO 97/35265 | 9/1997 |
| WO | WO 99/05620 | 2/1999 |
| WO | WO 99/45451 | 9/1999 |
| WO | WO 00/22543 | 4/2000 |
| WO | PCT 2002/0138599 | 9/2002 |
| WO | PCT 2002/0174372 | 11/2002 |

OTHER PUBLICATIONS

Research Disclosure; "Provide Auto-Forwarding Based on Criteria Selected by the User"; Oct. 1, 1989; 1 page; No. 306; Kenneth Mason Publications; XP000085405; ISSN; 0374-4353.
Bellovin, Steven M. et al., "Network Firewalls," IEEE Communications Magazine, Sep. 1994, pp. 50-57.
Braun, Hans-Werner, et al., "Web Traffic Characterization: An Assessment of the Impact of Caching Documents from NCSA's Web Server," Computer Networks and ISDN Systems, 1995, pp. 37-51, vol. 28.
Brown, Margaret J., "The Visto Briefcase Pro Puts Your PIM On The Internet," Aug. 13, 1998, 1 page. URL:http://www.zdnet.com/zdnn/stories/zdnn_display/0,3440,341892,00.html.
Cobb, S., Director of Special Projects National Computer Security Association, "Establishing Firewall Policy," Jun. 25-27, 1996, pp. 198-205, ISBN# 0-7803-3268-7.
Greenwald, Michael, et al., "Designing an Academic Firewall: Policy, Practice, and Experience With SURF," Proceedings of SNDSS 1996, 1996 IEEE, Feb. 22, 1996, pp. 79-92.
Kiuchi, Takahiro, et al., C-HTTP—The Development of a Secure, Closed HTTP-based Network on the Internet, Proceedings of SNDSS 1996, 1996 IEEE, Feb. 22, 1996, pp. 64-75.
Marinacci, Enzo, "Bookmark Translator 2.0—This Utility Transform Microsoft Internet Explore's Bookmarks in the Format Valid for Netscape Nagivator and vice versa," Jul. 1997, 4 pages, Published in Rome, Italy. URL:http://www.bns.it/EMware/Bookmark/Translator-uk.html.
Nelson, Ruth, et al., "Security for Infinite Networks," 1995 IEEE, Aug. 22, 1995, pp. 11-19.
Stempel, Steffen, "IpAccess—An Internet Service Access System for Firewall Installations," 1995 IEEE, Feb. 16, 1995, pp. 31-41.
Radosevich, Linda, "Users want unified mail directories,"Computerworld, Aug. 30, 1993, p.12.
Bruno, Charles, "Firm pushes E-mail limits beyond rivals'," Network World, Aug. 12, 1991, pp. 33, 53.
Sliwa, Carol and Cole, Barb, "MESA declares a groupware detente," Network World, Aug. 5, 1996, p. 29.
Grosse, Eric, "Repository Mirroring," ACM Transactions on Mathematical Software, vol. 21, No. 1, Mar., 1995, pp. 89-97.
Schilit, Bill N. and Theimer, Marvin M., "Disseminating Active map Information to Mobile Hosts," IEEE Network, Sep./Oct. 1994, pp.22-32.
Levy, Eliezer and Silberschatz, Abraham, "Distributed File Systems: Concepts and Examples," ACM Computing Surveys, Vol. 22, No. 4, Dec. 1990, p. 321-74.
Rymer, John R., "The Muddle in the Middle," Byte, Apr. 1996, pp. 67-70.
Baum, David, "Intranet Politics and Technologies," Byte, May 1997, pp. 88A-88H.
Udell, Jon, "Push Me, Pull You," Byte, Sep. 1996, pp. 117-120.

Kador, John, "The Ultimate Middleware," Byte, Apr.1996, pp. 79-83.
Brown, Mark, "Using Netscape 2," Que Corporation, 1995, pp. 885-907.
Kramer, Douglas, "The Java Platform," Javasoft, May 1996, pp. 1-25.
Package java.applet; java.net, http://www-nrg.ee.lbl.gov/j4/apibook/javaf.htm, javam.htm, Apr. 22, 1996.
Servlet Tutorial, http://mech.postech.ac.kr/Java/java.sun.com/products/jeeves/currentrelease/doc/servlet_tutorial/servlet_tutorial.html.
Freier et al., entitled "The SSL Protocol, Version 3.0,"Netscape Communications, dated Nov. 18, 1996, pp. 1-59, Downloaded from URL=http://www.home.netscape.com/eng/ss13/draft302.txt.
Java Servlet Application Programming Interface White Paper, http://mech.postech.ac.kr/Java/java.sun.com/products/jeeves/CurrentRelease/doc/api.html, Aug. 1996, pp. 1-6.
Singhal, M., "Update transport: A new technique for update synchronization in replicated database systems," IEEE Transactions on Software Engineering, vol. 16, No. 12, Dec. 1990, pp. 1325-1336.
Rao, H. & Skarra, A., "A transparent service for syncronized replication across loosely-connected file systems," IEEE Transactions on Software Engineering, Apr. 1995, pp. 110-117.
Crispin, M., "Internet Message Access Protocol - RFC 1730 Version 4," Dec. 1994, pp. 1-52, http://faqs.org/rfcs/rfc1730.html.
Rao, Venkat & Aline, Mary, "Burrowing through firewalls," Dec. 1996, pp.1-5, http://java.sun.com/developer/technicalArticles/InnerWorkings/Burrowing/.
Brown, Margaret J., "The Visto Briefcase Pro Puts Your PIM On The Internet," Aug. 13, 1998, 1 page, URL:http://www.zdnet.com/zdnn/stories/zdnn_display/0,3440,341892,00.html.
Tanenbaum, Andrew, "Computer Networks," Third Edition, Prentice-Hall, 1996, see entire document.
Knudsen, Jonathan, "Java Cryptography," O'Reilly, 1998, pp. 79-91, 112, 160.
Verisign Press Release, "Verisign Enhances Digital IDS to Enable Universal Website Login and One-step Registration," <www.verisign.com/press/product/isv.html>, especially 2nd paragraph.
Crispin, M., "IMAP4 Compatibility With IMAP2BIS", Network Working Group RFC 2061, Dec. 1996, XP002154026, <URL:http://www.imc.org/rfc2061>, retrieved Nov. 28, 2000, page 1, last paragraph.
"Configuration of a wireless-connected mobile computer," IBM Technical Disclosure Bulletin, US, IBM Corp., New York, vol. 38, No. 4, Apr. 1, 1995, pp. 15-17, XP000516057, ISSN: 0018-8689, the whole document.
Mason, Justin, "Tunneling over HTTP," Dec. 11, 1996, pp. 1-2 http://www.netsys.com/firewalls/firewalls-9612/0488.html.
Elgamal, Taher, "The Secure Sockets Layer Protocol (SSL)," agenda for the Danvers IETF Meeting, Apr. 1995, pp. 1-5 - http://www.ietf.cnri.reston.va.us/proceedings/95apr/sec/cat.elgamal.slides.html.
Research Disclosure: "Provide Auto-Forwarding Based On Criteria Selected by the User"; Oct. 1, 1989; 1 page; No. 306; Kenneth Mason Publications; XP000085405; ISSN 0374-4353.
Chan, M.C. et al., "Applications of Compaction Technique to Optimizi ng Wireless Email Transfer," IEEE Wireless Communications and Networking Conference 1999, p. 1535 Section A.
Crispin, M., "Internet Message Access Protocol Version 4rev1," 1996 Section 2.3.1.1.
Jaeger and Prakash, "Implementation of a Discretionary Access Control Model for Script-based Systems," IEEE Jun. 1995.
Adams, Charlotte, "Multilevel Secure Networking Charges Ahead," Federal Computer Week, Apr. 12, 1993.
Kohl, John, "The Evolution of the Kerberos Authentication Service," 1991.
Young et al., "Deniable Password Snatching: On the Possibility of Evasive Electronic Espionage," 1997, IEEE, p. 224-35.
Abel, Amee, "E-mail anywhere," May 1998, Time, pp. 1-4.
Satyanarayanan, M., "Integrating Security in a Large Distributed System," ACM Transactions on Computer Systems, vol. 7, No. 3, Aug. 1989, p. 247-80.

Kistler, James J. and Satyanarayanan, M., "Disconnected Operation in the Coda File System," ACM Transactions on Computer Systems, vol. 10, No. 1, Feb. 1992, pp. 3-25.
Hills, Alex and Johnson, David B., "Wireless Data Network Infrastructure at Carnegie Mellon University," IEEE Personal Communications, 3(1), Feb. 1996.
Satyanarayanan, Mahadev, "Mobile Information Access," IEEE Personal Communications, Feb. 1996, pp. 26-33.
Satyanarayanan, Mahadev et al., "Coda: A Highly Available File System for a Distributed Workstation Environment," IEEE Transactions on Computers, vol. 39, No. 4, Apr. 1990, p. 457-59.
Satyanarayanan, Mahadev, "Scalable, Secure, and Highly Available Distributed File Access," Computer, May 1990, pp. 9-21.
Mummert, Lily B. et al., "Exploiting Weak Connectivity for Mobile File Access," SIGOPS '95, Dec. 1995, p. 143-55.
Terry, Douglas B. et al., "Managing Update Conflicts in Bayou, a Weakly Connected Replicated Storage System," SIGOPS '95, Dec. 1995, pp. 172-183.
Demers, Alan et al., "The Bayou Architecture: Support for Data Sharing among Mobile Users," Proceedings of the Workshop on Mobile Computing Systems and Applications, Santa Cruz, California, Dec. 1994, pp. 2-7.
Petersen, Karin et al., "Bayou: Replicated Database Services for World-wide Applications," Proceedings Seventh ACM SIGOPS European Workshop (EuroSIGOPS '96), Connemara, Ireland, Sep. 1996, pp. 275-280.
Crocker, David H., "RFC822: Standard for ARPA Internet Text Messages," http://www.w3.org/Protocols/rfc822/.
Theisen, Tim, "AFS distributed filesystem FAQ (1/2)," posted to uwisc.general newsgroup, Jul. 25, 1994.
Theisen, Tim, "AFS distributed filesystem FAQ (2/2)," posted to uwisc.general newsgroup, Jul. 25, 1994.
Schubert, Eric, "Re: telnet/internet and ... ," posted to comp.sys. hp.mpe newsgroup, Jun. 30, 1995.
Glazman, Daniel, "SOFTWARE:HHTPtool [sic] 1.1, a file transfer utility over HTTP using PUT and GET," posted to comp. infosystems.www.announce newsgroup, May 17, 1995.
Glazman, Daniel, "SOFTWARE:HHTPtool v1.0 for Windows3.x, file transfer utility over HTTP," posted to comp.infosystems.www. announce newsgroup, Mar. 21, 1996.
Angus, Jeffrey G., "Sales force automation has a GoldMine," Computerworld, Oct. 7, 1996, p. 59.
Salamone, salvatore, "Middle(ware) Management," Byte, Apr. 1996, pp. 71-76.
Nance, Barry, "Balance the Load with Transaction Server," Byte, Jun. 1997, pp. 81-84.
Francett, barbara, "Replication on the Run," Software Magazine, Aug. 1996, pp. 63-66.
Darling, Charles B., EDA/SQL Loses a Little and Gains a Lot, Datamation, May 1, 1996, p. 12.
Varney, Sarah E., "Arm your salesforce with the Web," Datamation, Oct. 1996, pp. 72-74.
Fulcher, Jim, "Is it or isn't it?," Manufacturing Systems, Oct. 1996, pp. 56-61.
Lamb, John and Cusato, Tony, "LAN-Based Office for the Enterprise, A Case Study," Proceedings, 19th Conference on Local Computer Networks, Minneapolis, Minnesota, Oct. 2-5, 1994, pp. 440-447.
Kawell Jr., Leonard et al., "Replicated Document Management In A Group Communication System," presented at the Second Conference on Computer-Supported Cooperative Work, Portland, Oregon, Sep. 26-28, 1988, as printed in Groupware: Software for Computer-Supported Cooperative Work, IEEE Computer Society Press, pp. 226-235.
Hong, Jack et al., "Personal Electronic Notebook with Sharing," Proceedings of the Fourth Workshop on Enabling Technologies: Infrastructure for Collaborative Enterprises, Berkley Springs, West Virginia, Apr. 20-22, 1995, pp. 88-94.
Mace, Scott, "DataSync 2.0 enhances synchronization of data," InfoWorld, Jun. 6, 1994, p.28.
Mace, Scott, "Database replication products debut, " InfoWorld, Nov. 15, 1993, p.19.
Gryphon, Robert, "DataSync line matches up," InfoWorld, May 23, 1994, p. 161.
Patterson, John F. et al., "Notification Servers for Synchronous Groupware," Proceedings, ACM 1996 Conference on Computer Supported Cooperative Work, Boston, Massachusetts, Nov. 16-20, 1996, pp. 122-129.
Zhao, Jian and Hoppe, H. Ulrich, "Supporting Flexible Communication in Heterogeneous Multi-User Environments," 1994 IEEE, pp. 442-449.
Gong, Li, "Enclaves: Enabling Secure Collaboration Over the Internet," IEEE Journal on Selected Areas in Communications, vol. 15, No. 3, Apr. 1997, pp. 567-575.
Bruno, Lee, "Directory Services Tie It All Together," Data Communications, Mar. 1997, pp. 75-83.
Guy, Richard G. et al., "Implementation of the Ficus Replicated File System," Proceedings of the Summer 1990 USENIX Conference, Anaheim, California, Jun. 11-15, 1990, pp. 63-70.
Page, Thomas W. Jr. et al., "Management of Replicated Volume Location Data in the Ficus Replicated Data System," Conference Proceedings, USENIX Summer 1991 Technical Conference, Nashville, Tennessee, Jun. 10-14, 1991, pp. 17-29.
Reiher, Peter et al., "Resolving File Conflicts in the Ficus File System," Conference Proceedings, USENIX Summer 1994 Technical Conference, Boston, Massachusetts, Jun. 6-10, 1994, pp. 183-195.
Walker, Bruce et al., "The LOCUS Distributed Operating System," Proceedings of the Ninth ACM Symposium on Operating Systems Principles, Bretton Woods, New Hampshire, Oct. 10-13, 1983, pp. 49-70.
Parker, D. Stott Jr. et al., "Detection of Mutual Inconsistency in Distributed Systems," IEEE Transactions on Software Engineering, vol. SE-9, No. 3, May 1983, pp. 240-246.
Ceri, Stefano et al., "The Case for Independent Updates", Second Workshop on the Management of Replicated Data, Monterey, California, Nov. 12-13, 1992, pp. 17-19.
Downing, Alan R. et al., "OSCAR: A System for Weak-Consistency Replication", Proceedings, Workshop on the Management of Replicated Data, Houston, Texas, Nov. 8-9, 1990, pp. 26-30.
Siegel, Alex et al., "Deceit: A Flexible Distributed File System", Proceedings of the Summer 1990 USENIX Conference, Anaheim, California, Jun. 11-15, 1990, pp. 51-61.
Chutani, Sailesh, "The Episode File System", Conference Proceedings, USENIX Winter 1992 Technical Conference, San Francisco, California, Jan. 20-24, 1992, pp. 43-59.
Seltzer, Margo, "An Implementation of a Log-Structured File System for UNIX", Conference Proceedings, USENIX Winter 1993 Technical Conference, San Diego, California, Jan. 25-29, 1993, pp. 307-326.
Vahalia, Uresh, "Metadata Logging in an NFS Server", Conference Proceedings, USENIX 1995 Technical Conference on UNIX and Advanced Computing Systems, New Orleans, Louisiana, Jan. 16-20, 1995, pp. 265-276.
Lotus Development Corporation, InterNotes Web Publisher Release 4, "InterNotes Web Publisher Guide", 1996, Cambridge, MA.
Lotus Development Corporation, Lotus Notes Release 4, "Database Manager's Guide", 1995, Cambridge, MA.
Lotus Development Corporation, Lotus Notes Release 4, "Administrator's Guide", 1995, Cambridge, MA.
IBM Lotus Technical Library, Lotus Documentation, "Lotus Notes Internet Cookbook for Notes Release 3", Jan. 16, 1996, pp. 1-26.
John Wiley & Sons, Inc. — Wiley Computer Publishing, Falkner, Mike, "How to Plan, develop, and Implement Lotus Notes in Your Organization", 1996, USA4.
Lotus Development Corporation, Lotus Notes Release 4, "Deployment Guide", 1995, Cambridge, MA.
McGraw-Hill, Lamb, John P. and Lew, Peter W., "Lotus Notes Network Design for Notes Release 3 and 4", 1996, Quebecor-Fairfield, PA.
Lotus Notes, "Overview — What is Lotus NotesPump?", including "notes Pump 1.0 Release Notes."
Lotus Development Corporation, Lotus Notes Release 3.1, The groupware standard, "Site and System Planning Guide", 1994, Cambridge, MA.

Lotus Development Corporation, Lotus Notes Release 3.1. The groupwarestandard, "Administrator's Guide Server for NetWare, OS/2, and UNIX", 1994, Cambridge, MA.

IBM Lotus Technical Library, Lotus Documentation, "Lotus Notes Internet Cookbook for Notes Release 4", Feb. 14, 1996, pp. 1-30 http://www-12.lotus.com/ldd/doc/domino_notes/cookbook/cbookv4,nsf/e125003289bf7b3a385256.

IntelliLink Corporation, IntelliLink for Windows Release 3.0, "User's Guide", 1994, Nashua, NH.

Lotus Development Corporation, Lotus Notes Release 4, "Application Developer's Guide", 1995, Cambridge, MA.

Lotus Development Corporation, Lotus Notes Release 3.3 North American Server Edition, "Lotus Notes, the Groupware Standard", 1994, Cambridge, MA.

Sams Publishing, Dahl, Andrew, "Lotus Notes 4 Administrator's Survival Guide", 1996, Indianapolis, IN.

Sams Publishing, Tmaura, et al., "Lotus Notes 4 Unleashed", 1996, Indianapolis, IN.

Advisor Publications — Lotus Notes Advisor, Pyle, Hugh, "The Notes Architecture", 1995.

Advisor Publications — Lotus Notes Advisor, Augun, Adury, "Integrating Lotus Notes with Enterprise Data", 1996.

Advisor Publications — Lotus Notes Advisor, Opyt, Barbara and Dale, Robert, "Use the Internet as Your Lotus Notes WAN", 1996.

Lotus Development Corporation, Lotus Notes Knowledge Base, "What is the Notes Replicator?", 1995, Cambridge, MA.

Lotus Development Corporation, Lotus Notes Knowledge Base, "Firewall Security Overview and How Firewalls Relate to Lotus Notes", 1996, Cambridge, MA.

Network Computing, Frenkel, Garry, "Pumping for Info: Notes and Database Integration", 1996.

IBM Corporation, Hawker, et al., "Secrets to Running Lotus Notes: The Decisions No One Tells You How to Make", 1996, Research Triangle Park, NC.

US 5,373,559, 12/1994, Kaufman et al. (withdrawn)

* cited by examiner

SYSTEM AND METHOD FOR TRANSMITTING WORKSPACE ELEMENTS ACROSS A NETWORK

CROSS-REFERENCE TO PRIORITY APPLICATION

This application is a continuation claims priority to the patent application entitled "System and Method for Globally and Securely Accessing Unified Information in a Computer Network," Ser. No. 09/666,877, filed on Sep. 20, 2000, now U.S. Pat. No. 6,708,221 by inventors Daniel J. Mendez, Mark D. Riggins, Prasad Wagle, Hong Q. Bui, Mason Ng, Sean Micheal Quinlan, Christine C. Ying, Christopher R. Zuleeg, David J. Cowan, Joanna A. Aptekar-Strober and R. Stanley Bailes, and hereby incorporates by reference U.S. Pat. No. 6,085,192, issued on Jul. 4, 2000, entitled "System and Method for Securely Synchronizing Multiple Copies of a Workspace Element in a Network," application Ser. No. 08/835,997, filed on Apr. 11, 1997, by inventors Daniel J. Mendez, Mark D. Riggins, Prasad Wagle and Christine C. Ying.

BACKGROUND OF THE INVENTION

1. Field of the Invention

This invention relates generally to computer networks, and more particularly to a system and method for using a global translator to synchronize workspace elements such as files across a computer network.

2. Description of the Background Art

Data consistency is a significant concern for computer users. For example, when maintaining multiple independently-modifiable copies of a document, a user risks using an outdated version. By the time the user notices an inconsistency, interparty miscommunication or data loss may have already resulted. The user must then spend more time attempting to reconcile the inconsistent versions and addressing any miscommunications.

The problem of data inconsistency is exacerbated when multiple copies of a document are maintained at different network locations. For example, due to network security systems such as conventional firewall technology, a user may have access only to a particular one of these network locations. Without access to the other sites, the user cannot confirm that the version on the accessible site is the most recent draft.

Data consistency problems may also arise when using application programs from different vendors. For example, the Netscape Navigator™ web browser and the Internet Explorer™ web browser each store bookmarks for quick reference to interesting web sites. However, since each web browser uses different formats and stores bookmarks in different files, the bookmarks are not interchangeable. In addition, one web browser may store a needed bookmark, and the other may not. A user who, for example, runs the Internet Explorer™ web browser at home and runs the Netscape Navigator™ web browser at work risks having inconsistent bookmarks at each location.

Therefore, a system and method are needed for providing users with data consistency, and more particularly for synchronizing multiple copies of a workspace element such as a document across a computer network.

SUMMARY OF THE INVENTION

The present invention provides a system and method for using a global translator to synchronize multiple copies of a workspace element in a secure network environment. The secure network environment includes a global server connected to multiple clients. Using the present system and method, the clients automatically synchronize workspace elements between multiple sites, independent of whether the sites are protected by site firewalls. Using the present system and method, the clients can automatically synchronize workspace elements across different formats and can merge workspace element folders for cross use.

The system includes a first store for storing first workspace elements in a first format, a second store for storing second workspace elements in a second format, a communications channel coupling the first store to the second store, synchronization means for synchronizing first workspace elements and second workspace elements, and a translator for translating between the first format and the second format.

Similarly, the method includes the steps of accessing a first store storing a first workspace element in a first format, accessing a second store storing a second workspace element in a second format, synchronizing the first workspace element and the second workspace element, and translating between the first format and the second format.

The system and method advantageously use a trusted third party to enable the synchronization of workspace data among multiple sites. Accordingly, a client user who maintains a work site, a home site, an off-site and the global server site can synchronize the workspace data or portions thereof among all four sites. Further, the predetermined criteria (which control when the synchronization-start module initiates synchronization) may be set so that the general synchronization module synchronizes the workspace data upon user request, at predetermined times during the day such as while the user is commuting, or after a predetermined user action such as user log-off or user log-on. Because the system and method operate over the Internet, synchronization can occur over any distance. Since the system and method include format translation, merging of workspace elements between different application programs and different platforms is possible. Further, because synchronization is initiated from within the firewall, the typical firewall which prevents in-bound communications does not act as an impediment to workspace element synchronization. Also, since the user's preferences may be previously set, the present system and method may operate unattended by the client user.

DETAILED DESCRIPTION OF THE PREFERRED EMBODIMENT

Figure 1:
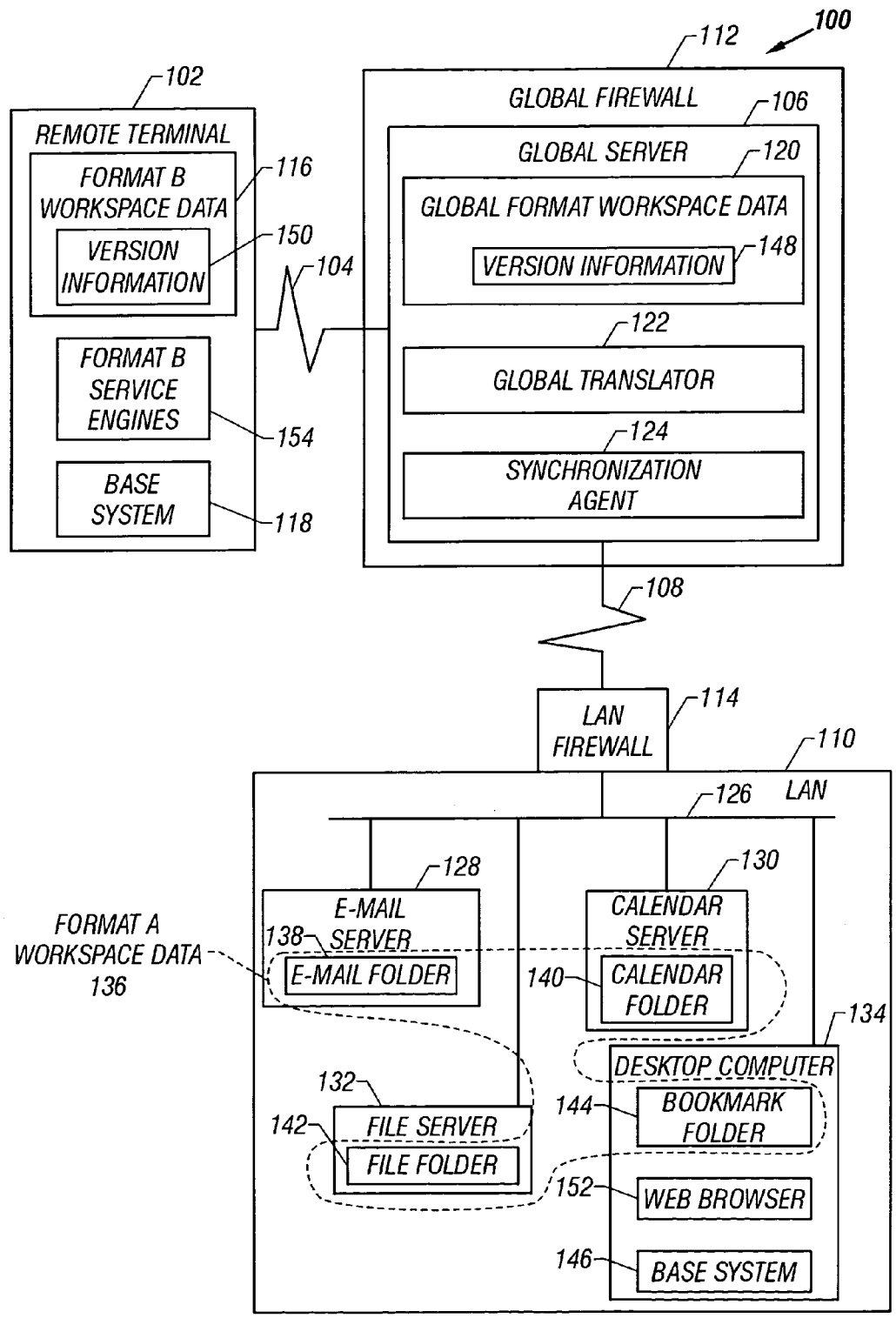
FIG. 1 is a block diagram illustrating a computer network in accordance with the present invention.

FIG. 1 is a block diagram illustrating a computer network 100, comprising a first node such as a remote computer terminal 102 coupled via a communications channel 104 such as the Internet to a global server 106. The global server 106 is in turn coupled via a communications channel 108 such as the Internet to a second node such as a Local Area Network (LAN) 110. The global server 106 is protected by a global firewall 112, and the LAN 110 is protected by a LAN firewall 114.

The LAN 110 includes a system bus 126 coupling the LAN firewall 114 to an e-mail server 128 having an e-mail folder 138 containing e-mails, to a file server 132 having a file folder 142 containing files, to a calendar server 130 having a calendar folder 140 containing calendar data, and to a desktop computer 134 having a web browser 152 and a bookmark folder 144 containing bookmarks. It will be appreciated that the e-mail folder 138, file folder 142, calendar folder 140 and bookmark folder 144 or portions thereof may be stored at different locations such as on the desktop computer 134. The e-mail folder 138, file folder 142, calendar folder 140 and bookmark folder 144 are exemplary, grouped by like information and are collectively referred to herein as "workspace data" 136. Those skilled in the art will recognize that the workspace data 136 may include other types of data such as an application program such as Microsoft Word 6.0.1 and the documents created using them. It will be further appreciated that the e-mail folder 138, file folder 142, calendar folder 140 and bookmark folder 144 may each be divided into workspace elements, wherein each workspace element folder or each workspace element individually is identified by particular version information 255 (described below with reference to FIG. 2). Accordingly, each e-mail or e-mail folder, file or file folder, calendar or calendar folder, bookmark or bookmark folder, document or document folder, etc. may be referred to as "a workspace element."

Each workspace element of workspace data 136 in LAN 110 is maintained in a predetermined format, referred to as Format A, which is based on the service engine 245 (FIG. 2) that created it. For example, the web browser 152 on the desktop computer 134 may be the Netscape Navigator™ web browser, and the bookmarks in the bookmark folder 144 created thereby are maintained in Format A. Although Format A is being described as a single format, one skilled in the art knows that Format A actually includes a format for each information type, e.g., there will be a Format A for bookmarks, a Format A for files, a Format A for calendar data, a Format A for e-mails, etc.

The remote terminal 102 stores service engines 154 for maintaining workspace data 116, which may include information common with information in the workspace data 136. The workspace data 116 is maintained in a format, referred to as Format B, which may be different from Format A. Format B is also based on the service engines 154 that create the workspace elements. For example, if one of the service engines 154 is the Internet Explorer™ web browser (not shown), then the bookmarks (not shown) created therewith are maintained in Format B. Although Format B is being described as a single format, one skilled in the art knows that Format B actually includes a format for each information type. Further, the workspace data 116 also includes version information 150 similar to version information 255 described below with reference to FIG. 2.

It will be appreciated that remote terminal 102 may include a smart telephone, a Personal Data Assistant (PDA) such as the PalmPilot system by the U.S. Robotics, Inc., a laptop computer, etc. As a smart telephone, the workspace data 116 may include telephone numbers and e-mails. As a PDA, the workspace data 116 may include addresses, calendar data and e-mails. As a laptop computer, the workspace data 116 may include the same types of information as workspace data 136.

The global server 106 acts as a third party administrator. The global server 106 stores independently-modifiable copies of selected portions of the workspace data 136 and 116, collectively referred to herein as workspace data 120. Accordingly, the workspace data 120 includes an independently-modifiable copy of each workspace element in the selected portions of the workspace data 136 and 116 and an independently-modifiable copy of each corresponding version information 255 (FIG. 2) and 150. The version information copies are collectively referred to herein as version information 148, and are also described with reference to FIG. 2.

The global server 106 maintains the workspace data 120 in a format, referred to as a "global format," which is selected to be easily translatable by the global translator 122 to and from Format A and to and from Format B. Although the global format is being described as a single format, one skilled in the art knows that the global format actually includes a global format for each information type, e.g., there will be a global format for bookmarks, a global format for files, a global format for calendar data, a global format for e-mails, etc. An example bookmark workspace element in the global format is described in detail below with reference to FIG. 6.

Network 100 further comprises synchronization means, which includes a base system 146 stored within the LAN 110 and for example on the desktop computer 134. Network 100 further includes a synchronization agent 124 stored outside the LAN firewall 114 and preferably on the global server 106. The base system 146 and the synchronization agent 124 cooperate to synchronize selected portions of the workspace data 136 with selected portions of the workspace data 120. The synchronization means may synchronize workspace elements individually, e.g., specific word processor documents, or may synchronize workspace element folders, e.g., a bookmark folder. Generally, the base system 146 manages the selected portion of the workspace data 136 within the LAN 110 and the synchronization agent 124 manages the selected portions of the workspace data 120 within the global server 106. It will be appreciated that the global translator 122 cooperates with the synchronization means to translate data formats to and from the global format. As described in greater detail below with reference to FIG. 4, the base system 190 preferably initiates and controls data synchronization. Other components and functions of the global server 106 are described in the cross-referenced patent application which is herein incorporated by reference.

The synchronization means may also include, stored on the remote terminal 102, a base system 118 which operates in a similar manner to the base system 146. The base system 118 on the remote terminal 102 cooperates with the synchronization agent 124 to synchronize selected portions of the workspace data 116 with selected portions of the workspace data 120. As described in greater detail below with reference to FIG. 4, the base system 118 on the remote terminal 102 also preferably initiates and controls data synchronization with the global server 106. Also, note that the distribution of labor between the base system 118 in the remote terminal 102 and the synchronization agent 124 in the global server 106 may vary. Sometimes, primarily when the remote terminal 102 is a relatively less computationally powerful device (such as a smart phone or a PDA), most of the actual computationally-intensive work will occur within the synchronization agent 124 in the global server 106. In other situations, for example, when the remote terminal 102 is a fully configured PC, most of the computationally-intensive work will occur locally on the base system 118 in the remote terminal 102.

Accordingly, the synchronization means independently synchronizes the selected portions of workspace data 116 and 136 with the selected portions of the workspace data 120. Thus, the synchronization means indirectly synchronizes workspace data 136 with workspace data 116.

Figure 2:
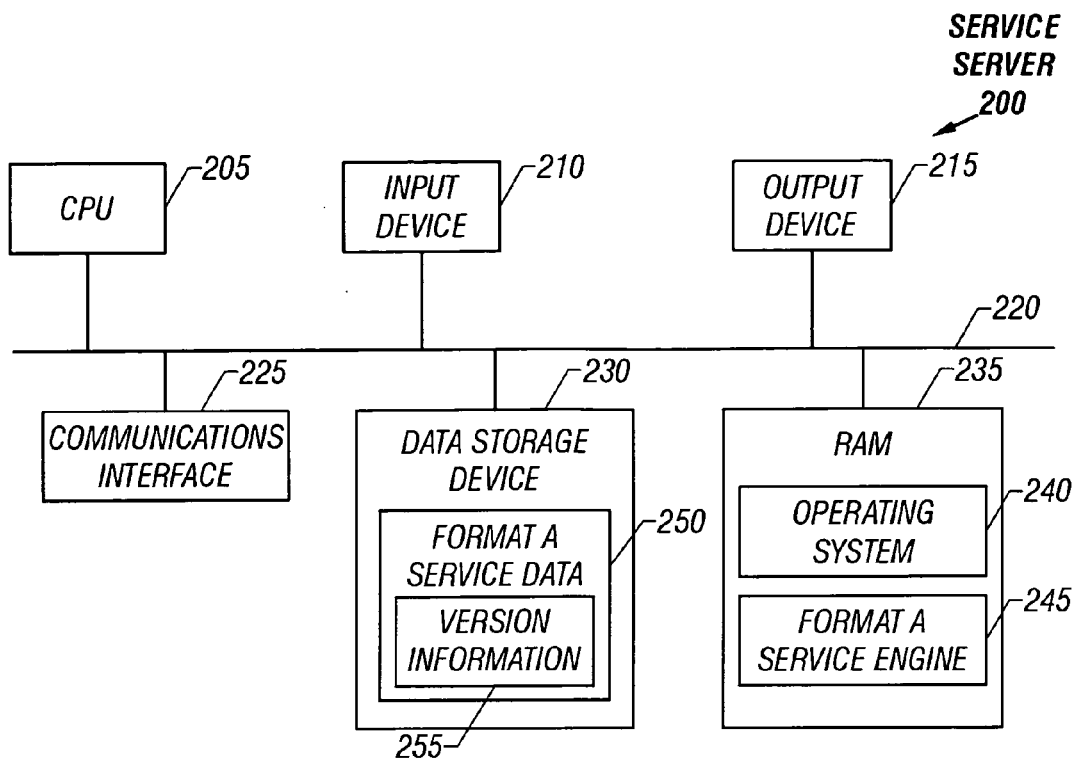
FIG. 2 is a block diagram illustrating details of a FIG. 1 service server.

FIG. 2 is a block diagram illustrating details of a service server 200, wherein each of the e-mail server 145, the file server 150, the calendar server 155 and the desktop computer 160 is an instance thereof. Service server 200 includes a Central Processing Unit (CPU) 205 such as an Intel Pentium® microprocessor or a Motorola Power PC® microprocessor. An input device 210 such as a keyboard and mouse and an output device 215 such as a Cathode Ray Tube (CRT) display are coupled via a signal bus 220 to CPU 205. A communications interface 225 (such as an Ethernet port), a data storage device 230 (such as a magnetic disk), and Random-Access Memory (RAM) 235 are further coupled via signal bus 220 to the CPU 205.

An operating system 240 includes a program for controlling processing by the CPU 205, and is typically stored in the data storage device 230 and loaded into the RAM 235 for execution. A service engine 245 includes a program for performing a particular service such as maintaining an e-mail data base, a file data base, a calendar data base or a bookmarks data base. The service engine 245 may also be stored in the data storage device 230 and loaded into the RAM 235 for execution.

To perform a service, the service engine 245 creates service data 250 (e.g., an e-mail or an e-mail folder 138 containing e-mails, a file or a file folder 142 containing files, calendar data or a calendar folder 140 containing calendar data, a bookmark or a bookmark folder 144 containing bookmarks, etc.) in Format A according to predetermined protocols. The service engine 245 stores the data 250 in the data storage device 250. The service data 250 includes version information 255 indicating the date and time of the last modification and the status as of the last interaction with the global server 106.

For example, if service data 250 is created and selected to be merged with global server workspace data 120, then the version information 255 for the service data 250 may include the date of last modification and a null set indicating the status as of the last interaction with the global server 106. From the version information 255, the base system 146 determines that the service data 250 in its entirety has not been merged with the global server workspace data 120. Similarly, if the service data 255 included elements 1, 2 and 3 as of the last modification, then the previous status as of the last interaction will indicate that the service data 255 included elements 1, 2 and 3. If the service data 255 currently includes elements 2, 3 and 4, then the base system 140 will determine, that, since last synchronization, element 1 has been deleted and element 4 has been added.

It will be appreciated that the version information 148 on the global server 106 includes information similar to version information 255. That is, the version information 148 will include information indicating the date and time the version was last modified and the status as of the last interaction with each client. The service engine 245 operates to update the version information 255 after modifications are made and after synchronization occurs.

Figure 3:
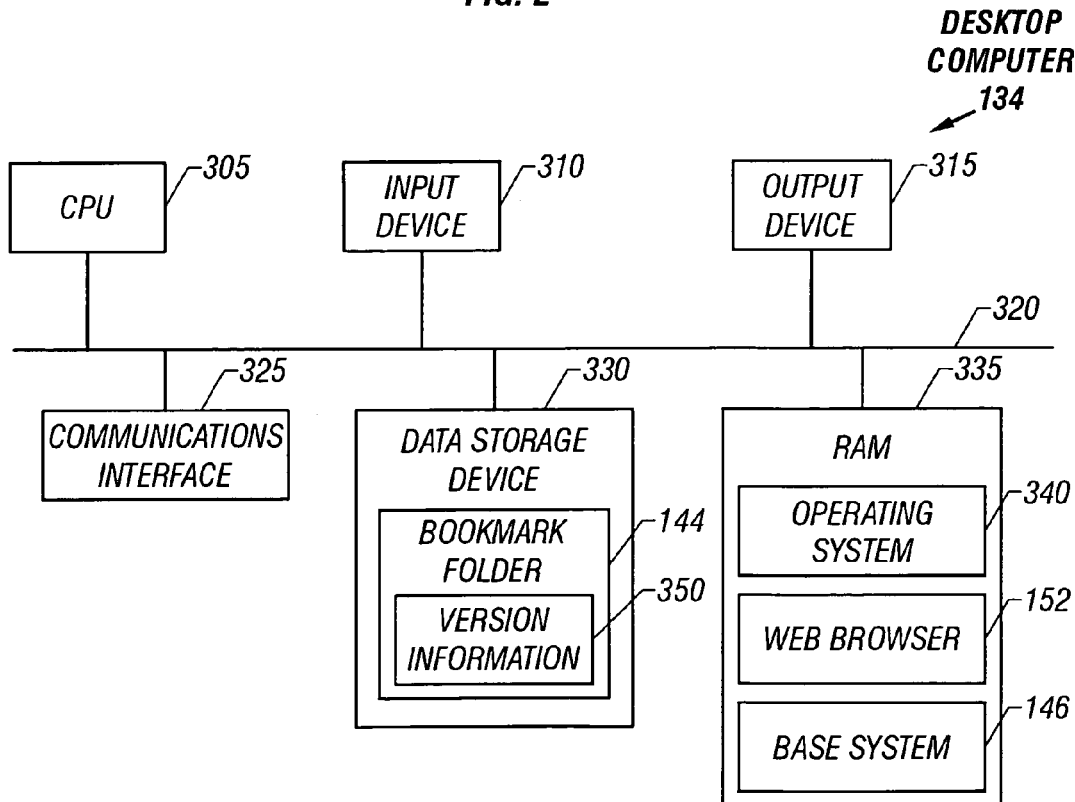
FIG. 3 is a block diagram illustrating details of the FIG. 1 desktop computer.

FIG. 3 is a block diagram illustrating details of the desktop computer 160, which includes a CPU 305, an input device 310, an output device 315, a communications interface 325, a data storage device 330 and RAM 335, each coupled to a signal bus 320.

An operating system 340 includes a program for controlling processing by the CPU 305, and is typically stored in the data storage device 330 and loaded into the RAM 335 for execution. A web browser 152 (i.e., a particular service engine 245, FIG. 2) includes a Format A service program for managing bookmark folder 144 (i.e., particular service data 250, FIG. 2) which includes version information 350 (i.e., particular version information 255, FIG. 2). The web browser 152 may be also stored in the data storage device 330 and loaded into the RAM 335 for execution. The bookmark folder 144 may be stored in the data storage device 330. As stated above with reference to FIG. 1, the base system 146 operates to synchronize the workspace data 136 (which includes the bookmark folder 144) with the workspace data 120. The base system 146 may be also stored in the data storage device 330 and loaded into the RAM 335 for execution.

Figure 4:
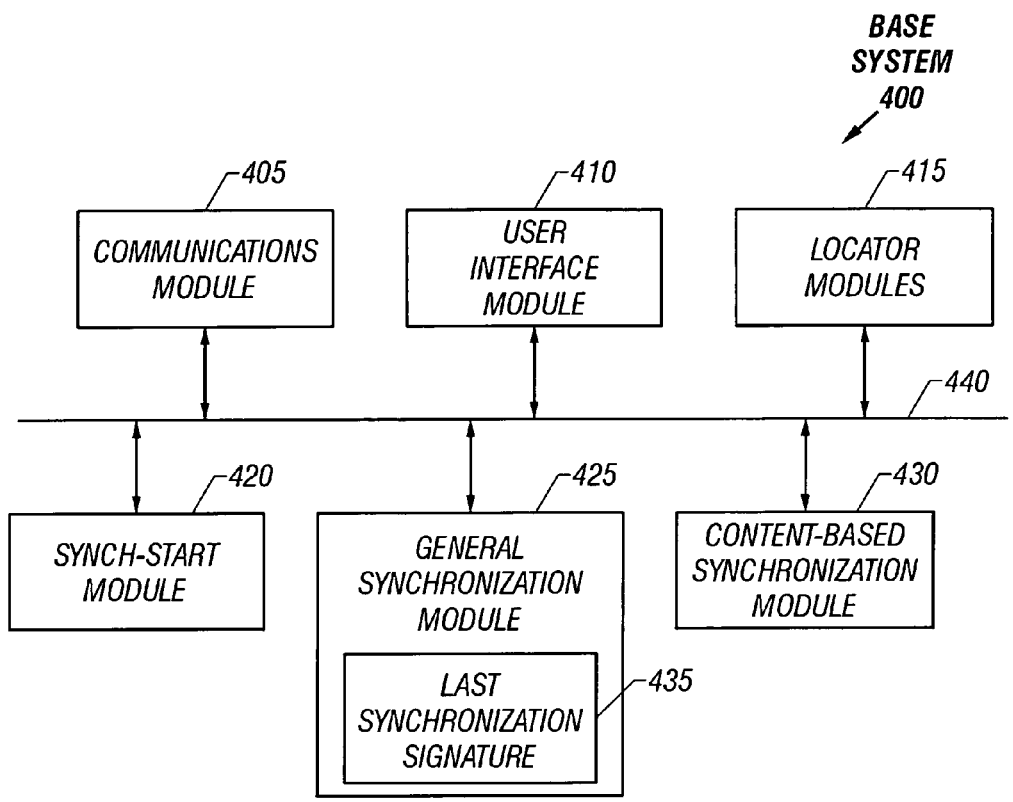
FIG. 4 is a block diagram illustrating details of a FIG. 1 base system.

FIG. 4 is a block diagram illustrating details of the base system 400, which exemplifies base systems 146 and 118. Base system 400 includes a communications module 405, a user interface module 410, locator modules 415, a synchronization-start ("synch-start") module 420, a general synchronization module 425 and a content-based synchronization module 430. For simplicity, each module is illustrated as communicating with one another via a signal bus 440.

The communications module 405 includes routines for compressing data and routines for communicating via the communications interface 325 (FIG. 3) with the synchronization agent 124 (FIG. 1). The communications module 405 may further include routines for applying Secure Socket Layer (SSL) technology and user identification and authentication techniques (i.e., digital certificates) to establish a secure communication channel through the global firewall 112. Examples of communications modules 405 may include TCP/IP stacks or the AppleTalk® protocol.

The user interface module 410 includes routines for communicating with a user, and may include a conventional Graphical User Interface (GUI). The user interface module 410 cooperates with the other system components as described herein.

The locator modules 415 include routines for identifying the memory locations of the workspace elements in the workspace data 136 or 116 and in the workspace data 120. Workspace element memory location identification may be implemented using intelligent software, i.e., preset memory addresses or the system's registry, or using dialogue boxes to query a user. More particularly, the locator modules 415 in the base system 146 determine the memory addresses of the e-mail folder 138, the file folder 142, the calendar folder 140 and the bookmark folder 144 and the memory addresses of the workspace elements therein. The locator modules 415 also determine the corresponding memory addresses of the corresponding folders in the workspace data 120 and the corresponding workspace elements therein. Similarly, the locator modules 415 in the base system 118 determine the memory locations of the workspace elements of workspace data 116 and the memory locations of the corresponding workspace elements in the workspace data 120.

It will be appreciated that the locator modules 415 may include locator modules 415 specifically dedicated to each folder or workspace data type. That is, the locator modules 415 may include a locator module 415 dedicated to locating bookmarks, a locator module 415 dedicated to locating e-mails, a locator module 415 dedicated to locating files, a locator module 415 dedicated to locating calendar appointments, etc. It will be further appreciated that the locator modules 415 may perform workspace element memory location identification upon system boot-up or after each communication with the global server 120 to maintain updated memory addresses of workspace elements.

The synchronization-start module 420 includes routines for determining when to initiate synchronization of workspace data 136 or 116 with workspace data 120. For example, the synchronization-start module 420 may initiate data synchronization upon user request, at a particular time of day, after a predetermined time period passes, after a predetermined number of changes, after a user action such as user log-off or upon like criteria. The synchronization-start module 420 initiates data synchronization by instructing the general synchronization module 425 (described below) to begin execution of its routines. It will be appreciated that communication with the synchronization agent 124 preferably initiates from within the LAN 110, because the typical firewall 114 prevents in-bound communications and allows out-bound communications.

The general synchronization module 425 includes routines for receiving version information 148 for modified versions from the synchronization agent 124 (FIG. 1), and routines for examining the version information 255 or 150 against a last synchronization signature 435 (such as a last synchronization date and time) to determine which versions have been modified. The general synchronization module 425 further includes routines for examining the version information 148 and the version information 255 or 150 to determine if one or both versions of a particular workspace element or workspace element folder have been modified.

Further, the general synchronization module 425 includes routines for performing an appropriate synchronizing responsive action. Appropriate synchronizing responsive actions may include, if only one version of a workspace element in workspace data 136 or 116 has been modified, then forwarding the modified version (as the preferred version) to the other store(s) or determining and forwarding only the changes made. Computing the changes made may be performed by examining the current status against the previous status as of the last synchronization or by comparing the two versions. It will be appreciated that no content-based review of the changes is needed. It will be appreciated that one store preferably forwards only the changes to the other store for optimizing use of processor power and minimizing the data communications across the communications channel 108 or 104.

Other appropriate synchronizing responsive actions may include, if two versions of a workspace element have been modified independently, then instructing the content-based synchronization module 430 (described below) to execute its routines. That is, if two versions of the same workspace element have been modified independently, then a content-based review of the changes is preferable. Upon completion of the data synchronization, the general synchronization module 425 updates the last synchronization signature 435.

The content-based synchronization module 430 includes routines for reconciling two or more modified versions of a workspace element. For example, if a user has independently modified the original and the copy of a workspace element since the last synchronization, then the content-based synchronization module 430 determines an appropriate responsive action. The content-based synchronization module 430 may request the user to select a preferred one of the modified versions or may respond based on preset preferences, i.e., by storing both versions in both stores or preferably by integrating the modified versions into a single preferred version which replaces each modified version at both stores.

The content-based synchronization module 430 examines the changes made to each version and determines if conflicts exist. When implementing version integration, a conflict may arise if inconsistent modifications such as deleting a paragraph in one version and modifying the same paragraph in the other version have been made. If a conflict exists, then the content-based synchronization module 430 attempts to reconcile the conflict, e.g., by requesting user selection or by storing both versions at both stores. Otherwise, if no conflict exists, then the content-based synchronization module 430 integrates the changes to each of the versions and updates the version information 148, 150 or 255 accordingly.

Figure 5:
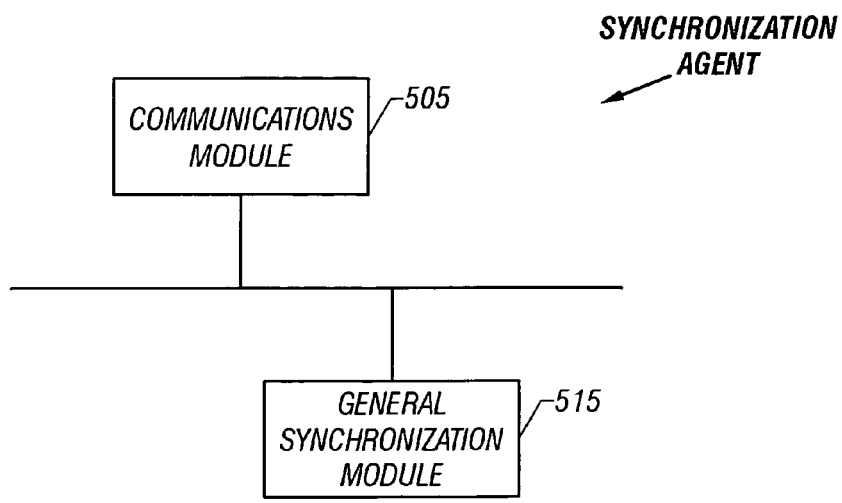
FIG. 5 is a block diagram illustrating details of the FIG. 1 synchronization agent.

FIG. 5 is a block diagram illustrating details of the synchronization agent 124, which includes a communications module 505 (similar to the communications module 405 described above with reference to FIG. 4) and a general synchronization module 515 (similar to the general synchronization module 425 described above also with reference to FIG. 4).

The communications module 505 includes routines for compressing data, and routines for communicating via the communications channel 108 with the base system 146 or via the communications channel 104 with the base system 118. The communications module 505 may further include routines for establishing a secure communications channel through the global firewall 112 and through the LAN firewall 114 with the communications module 405.

Similar to the general synchronization module 425, the general synchronization module 515 includes routines for examining the version information 148 and the last synchronization signature 435 (FIG. 4) to determine which versions have been modified and the changes made. It will be appreciated that the general synchronization module 515 may maintain its own last synchronization signature 435 copy (not shown) or may request the last synchronization signature 435 from the base system 146 or 118. The general synchronization module 515 further includes routines for forwarding workspace data 120 determined to be modified to the general synchronization module 425, and routines for receiving preferred versions of workspace elements of workspace data 136 or 116 or just the changes from the general synchronization module 425.

Figure 6:
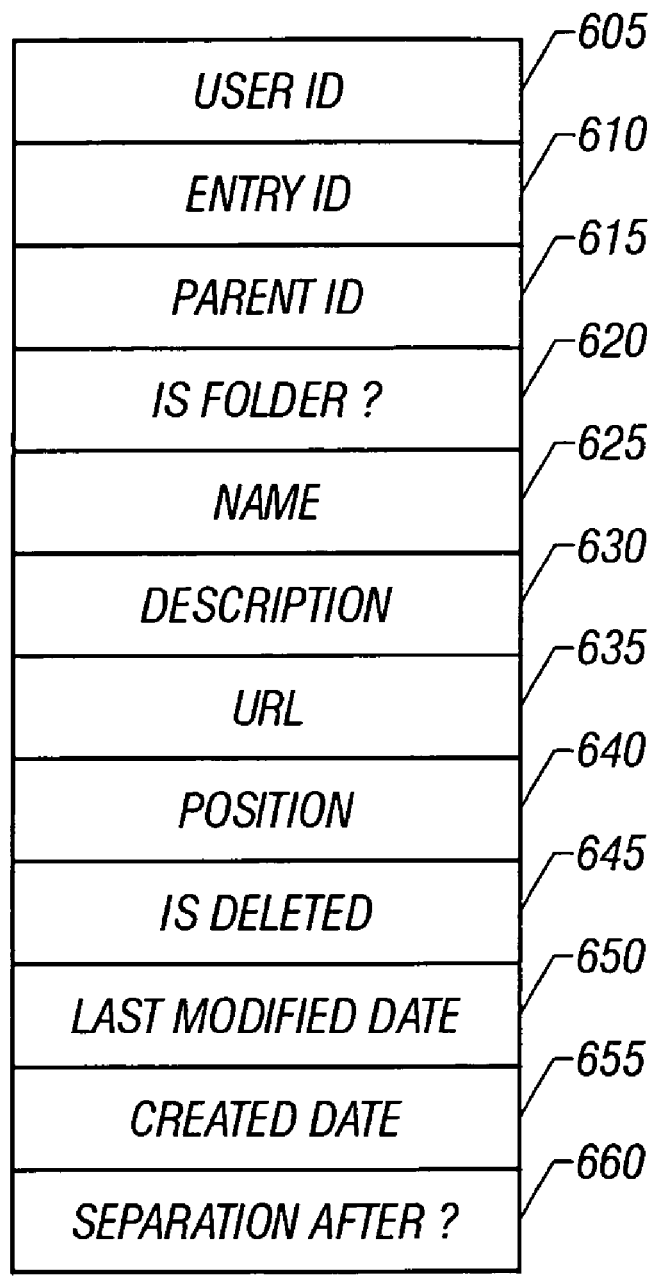
FIG. 6 is a graphical representation of an example bookmark in the global format.

FIG. 6 illustrates an example bookmark workspace element in the global format. The global translator 122 incorporates all the information needed by both formats (Format A and Format B) to create the Global Format. For example, if a bookmark in Format A needs elements X, Y and Z and a bookmark in Format B needs elements W, X and Y, the global translator 122 incorporates elements W, X, Y and Z to create a bookmark in the Global Format. Further, the global translator 122 incorporates the information which is needed by the synchronization means such as the last modified date. Accordingly, a bookmark in the Global Format includes a user identification (ID) 605, an entry ID 610, a parent ID 615, a folder ID flag 620, a name 625, a description 630, the Uniform Resource Locator (URL) 635, the position 640, a deleted ID flag 645, a last modified date 650, a created date 655 and a separation ID flag 660.

Figure 7:
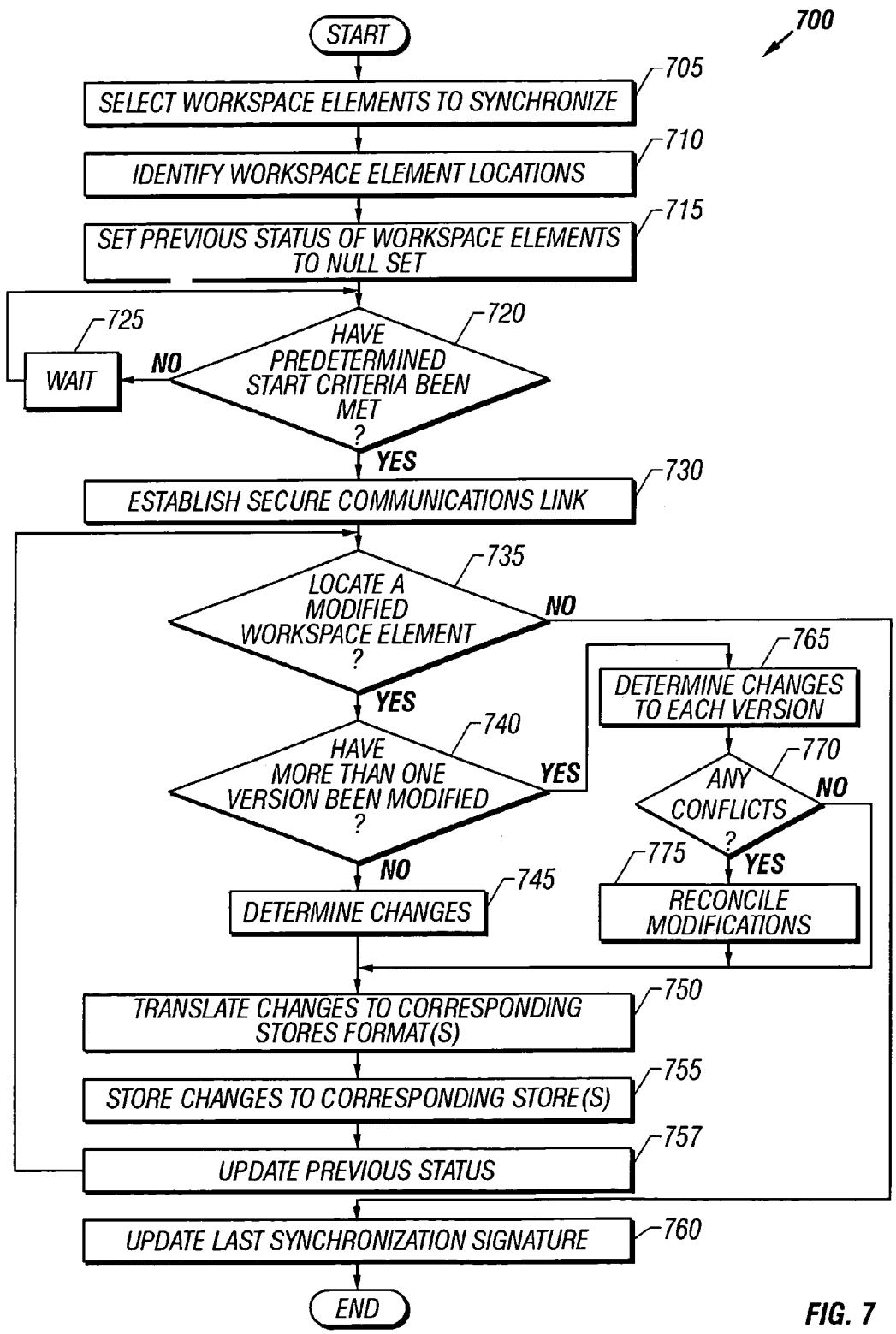
FIG. 7 is a flowchart illustrating a method for synchronizing multiple copies of a workspace element in a secure network.

FIG. 7 is a flowchart illustrating a method 700 for using a global translator 122 to synchronize multiple copies of a workspace element in a secure network 100. Method 700 begins with the user interface module 410 in step 705 enabling a user to select workspace elements of workspace data 136 and 118 for the synchronization means to synchronize. The locator modules 415 in step 710 identify the memory locations of the workspace elements in workspace data 136 and 116 and the corresponding memory locations in workspace data 120. If a selected workspace element does not have a corresponding memory location, such as in the case of adding a new workspace elements to the global server 106, then one is selected. The selected memory location may be a preexisting workspace element or a new workspace element. As stated above, workspace element memory location identification may be implemented using intelligent software or dialogue boxes. The general synchronization module 425 and general synchronization module 515 in step 715 set the previous status of the workspace elements equal to the null set. Setting the previous status to the null set indicates that all information of the workspace element has been added.

The synchronization-start module 420 in step 720 determines whether predetermined criteria have been met which indicate that synchronization of the workspace elements selected in step 705 should start. If not, then the synchronization-start module 420 in step 725 waits and loops back to step 720. Otherwise, the communications module 405 and communications module 505 in step 730 establish a secure communications channel therebetween.

The general synchronization module 425 and the general synchronization module 515 in step 735 determine whether any workspace elements have been modified. That is, the general synchronization module 425 in step 740 examines the version information 255 or 150 of each selected workspace element in the workspace data 136 or 116 against the last synchronization signature 435 to locate modified workspace elements. This comparison may include comparing the date of last modification with the date of last synchronization, or may include a comparison between the current status and the previous status as of the last interaction. Similarly, the general synchronization module 515 examines the version information 148 of each corresponding workspace element in workspace data 120 and the last synchronization signature 435 to locate modified workspace elements.

If in step 735 no modified workspace elements or folders are located, then the general synchronization modules 425 and 515 in step 760 update the last synchronization signature 435 and method 700 ends. Otherwise, the general synchronization module 425 in step 740 determines whether more than one version of a workspace element has been modified since the last synchronization.

If only one version has been modified, then the corresponding general synchronization module 425 or 515 in step 745 determines the changes made. As stated above, determining the changes made may be implemented by comparing the current status of the workspace element against the previous status of the workspace element as of the last interaction therebetween. If the changes were made only to the version in the workspace data 120, then the global translator 122 in step 750 translates the changes to the format used by the other store, and the general synchronization module 515 in step 755 forwards the translated changes to the general synchronization module 425 for updating the outdated workspace element in the workspace data 136 or 116. If the updated version is a workspace element in the workspace data 136 or 116, then the general synchronization module 425 sends the changes to the updated version to the global translator 122 for translation and then to the general synchronization module 515 for updating the outdated workspace element in the workspace data 120. The general synchronization module 425 and the general synchronization module 515 in step 757 update the previous state of to reflect the current state as of this interaction. Method 700 then returns to step 735.

If the general synchronization module 425 in step 740 determines that multiple versions have been modified, then the general synchronization module 425 in step 765 computes the changes to each version and in step 770 instructs the content-based synchronization module 430 to examine content to determine if any conflicts exist. For example, the content-based synchronization module 430 may determine that a conflict exists if a user deletes a paragraph in one version and modifies the same paragraph in another version. The content-based synchronization module 430 may determine that a conflict does not exist if a user deletes different paragraphs in each version. If no conflict is found, then method 700 jumps to step 750 for translating and forwarding the changes in each version to the other store. However, if a conflict is found, then the content-based synchronization module 430 in step 775 reconciles the modified versions. As stated above, reconciliation may include requesting instructions from the user or based on preselected preferences performing responsive actions such as storing both versions at both stores. Method 700 then proceeds to step 750.

It will be appreciated that in step 710 new workspace elements and preexisting workspace elements to which new workspace elements will be merged are set to "modified" and the previous status is set to the null set. Thus, the general synchronization module 425 in step 740 will determine that more that one version has been modified and the content-based synchronization module 430 in step 770 will determine that no conflict exists. The changes in each will be translated and forwarded to the other store. Accordingly, the two versions will be effectively merged and stored at each store.

For example, if a first bookmark folder was created by the web browser 152 on the desktop computer 134, a second folder was created by a web browser (not shown) on the remote terminal 102, no preexisting folder existed on the global server 106 and the user selected each of these folders for synchronization, then the synchronization means will effectively merge the first and second folders. That is, the general synchronization module 425 on the desktop computer 134 will determine that the first folder has been modified and the previous status is equal to the null set. The general synchronization module 425 will determine and send the changes, i.e., all the workspace elements in the first folder, to a new global folder on the global server 106. Similarly, the general synchronization module 425 on the remote terminal 102 will determine that, as of its last interaction, the previous status of each of the second and the global folders is the null set. The general synchronization module 425 will instruct the content-based synchronization module 430 to examine the changes made to each folder to determine whether a conflict exists. Since no conflicts will exist, the general synchronization module 425 will forward the changes to the global folder and the general synchronization module 515 will forward its changes to the second store, thereby merging the workspace elements of the first and second folders in the global and second folders. The general synchronization module 515 will inform the general synchronization module 425 that the global folder has been modified relative to the last interaction, and will forward the new changes to the first folder. Thus, the first and second folders will be merged and stored at each store.

For a second example, the user may select an exemplary document in the LAN 110 to be synchronized. The general synchronization module 425 will forward the document to the global server 106. Similarly, the user may select the same document for synchronization on the remote terminal 102. The general synchronization module 515 will forward the document to the remote terminal 102. If changes were made to the documents independently, then the content-based synchronization module 430 will examine the content of the documents to determine if a conflict exists. If no conflict exists, then as described above, the general synchronization modules 425 and 515 will merge the documents. Otherwise, if a conflict does exist, the content-based synchronization module 430 will reconcile the changes and then the general synchronization modules 425 and 515 will forward the reconciled changes to each other.

The foregoing description of the preferred embodiments of the invention is by way of example only, and other variations of the above-described embodiments and methods are provided by the present invention. For example, although the global server 106 is illustrated as a single device, the global server 106 may include several computers networked together. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims.

What is claimed is:

1. A method, comprising:
providing a first memory store including a first folder for storing first record entries in a file;
providing a second memory store coupled to the first memory store, the second memory store including a second folder for storing second record entries in a file, the second folder being synchronized with the first folder at a first moment in time such that a content of the second folder is consistent with the content of the first folder at the first moment in time;
providing a global server including a third memory store having a third folder for storing third record entries in a file;
receiving new first record entries in a file at the first memory store at a second moment in time later than the first moment in time;
electronically synchronizing the first folder and the third folder, such that a new third record entry is created in the third folder based on the new first record entries; and
electronically synchronizing the third folder and the second folder, such that a new second record entry is created in the second folder based on the new third record entry.

2. A system, comprising:
a first memory store including a first folder for storing first record entries in a file;
a second memory store coupled to the first memory store the second memory store including a second folder for storing second record entries in a file, the second folder being synchronized with the first folder at a first moment in time such that a content of the second folder is consistent with the content of the first folder at the first moment in time;
an interface for receiving new record entries in a file at the first memory store;
a general synchronization module for electronically synchronizing the first folder and a third folder such that a anew third record entry is created in the third folder based on the new first record entries; and
a synchronization agent for electronically synchronizing the third folder and the second folder such that a new second record entry is created in the second folder based on the new third record entry.

3. A system, comprising:
first memory means including a first folder for storing first record entries in a file;
second memory means coupled to the first memory means, the second memory means including a second folder for storing second file entries in a file, the second folder being synchronized with the first folder at a first moment in time such that a content of the second folder is consistent with the content of the first folder at the first moment in time;
providing a global server including a third memory means having a third folder for storing third record entries in a file;
means for receiving new record file entries at the first memory means;
means for electronically synchronizing the first folder and the third folder such that a new third record entry is created in the third folder based on the new first record entries; and
means for electronically synchronizing the third folder and the second folder, such that a new second record entry is created in the second folder based on the new third record entry.

4. A method, comprising:
providing a first memory store including a first folder for storing first record entries in a file;
providing a second memory store coupled to the first memory store, the second memory store including a second folder for storing second record entries in a file the second folder being synchronized with the first folder at a first moment in time such that a content of the second folder is consistent with the content of the first folder at the first moment in time;
providing a global server including a third memory store having a third folder for storing third record entries in a file;
receiving changes at the first memory store;
electronically synchronizing the first folder and the third folder such that the content of the changes creates a third record entry; and
electronically synchronizing the third folder and the second folder such that a new second record entry is created in the second folder based on the third record entry.

5. A system, comprising:
a first memory store including a first folder for storing first record entries in a file;
a second memory store coupled to the first memory store, the second memory store including a second folder for storing second record entries in a file, the second folder being synchronized with the first folder at a first moment in time such that a content of the second folder is consistent with the content of the first folder at the first moment in time;
providing a global server including a third memory store having a third folder for storing third record entries in a file;
an interface for receiving changes at the first memory store;

a general synchronization module for electronically synchronizing the first folder and the third folder such that the content of the changes creates a third record entry; and a synchronization agent for electronically synchronizing the third folder and the second folder such that a new second record entry is created in the second folder based on the third record entry.

6. A system, comprising:

first memory means including a first folder for storing first record entries in a file;

second memory means coupled to the first memory means the second memory means including a second folder for storing second file entries in a file, the second folder being synchronized with the first folder at a first moment in time such that a content of the second folder is consistent with the content of the first folder at the first moment in time;

providing a global server including a third memory means having a third folder for storing third record entries in a file;

means for receiving changes at the first memory means;

means for electronically synchronizing the first folder and the third folder such that the content of the changes creates a third record entry; and means for electronically synchronizing the third folder and the second folder, such that a new second record entry is created in the second folder based on the new third record entry.

* * * * *

US007225231C1

(12) INTER PARTES REEXAMINATION CERTIFICATE (0163rd)

United States Patent
Mendez et al.

(10) Number: US 7,225,231 C1
(45) Certificate Issued: May 25, 2010

(54) SYSTEM AND METHOD FOR TRANSMITTING WORKSPACE ELEMENTS ACROSS A NETWORK

(75) Inventors: Daniel J. Mendez, Mountain Valley, CA (US); Mark D. Riggins, San Jose, CA (US); Prasad Wagle, Santa Clara, CA (US); Christine C. Ying, Foster City, CA (US)

(73) Assignee: Visto Corporation, Redwood Shores, CA (US)

Reexamination Request:
No. 95/001,086, Oct. 2, 2008
No. 90/008,981, Jan. 9, 2008
No. 90/010,299, Oct. 2, 2008

Reexamination Certificate for:
Patent No.: 7,225,231
Issued: May 29, 2007
Appl. No.: 09/921,228
Filed: Aug. 1, 2001

Related U.S. Application Data

(63) Continuation of application No. 09/666,877, filed on Sep. 20, 2000, now Pat. No. 6,708,221.

(51) Int. Cl.
*G06F 13/00* (2006.01)

(52) U.S. Cl. ..................................... 709/206
(58) Field of Classification Search .................. None
See application file for complete search history.

(56) References Cited

U.S. PATENT DOCUMENTS

| 5,727,202 | A | 3/1998 | Kucala |
| 5,787,441 | A | 7/1998 | Beckhardt |
| 5,857,201 | A | 1/1999 | Wright et al. |
| 5,961,590 | A | 10/1999 | Mendez et al. |
| 5,968,131 | A | 10/1999 | Mendez et al. |
| 6,006,274 | A | 12/1999 | Hawkins |
| 6,023,708 | A | 2/2000 | Mendez et al. |
| 6,085,192 | A | 7/2000 | Mendez et al. |
| 6,131,096 | A | 10/2000 | Ng et al. |
| 6,151,606 | A | 11/2000 | Mendez et al. |
| 6,708,221 | B1 | 3/2004 | Mendez et al. |
| 7,039,679 | B2 | 5/2006 | Mendez et al. |
| 7,225,231 | B2 | 5/2007 | Mendez et al. |
| 2003/0097358 | A1 | 5/2003 | Mendez |
| 2003/0130984 | A1 | 7/2003 | Quinlan et al. |
| 2004/0117310 | A1 | 6/2004 | Mendez et al. |
| 2006/0195595 | A1 | 8/2006 | Mendez et al. |
| 2007/0174433 | A1 | 7/2007 | Mendez et al. |

FOREIGN PATENT DOCUMENTS

EP     0684558 A1     11/1995

OTHER PUBLICATIONS

Berners–Lee et al, Request for Comment 1945, Hypertext Transfer Protocol—HTTP/1.0, May 1996.
Brown, Kevin et al., Mastering Lotus Notes, 1995 Sybex Incorporated.
Lamb, John P. and Lew, Peter W., Lotus Notes Network Design, 1996 McGraw–Hill.

(Continued)

*Primary Examiner*—Ovidio Escalante

(57) ABSTRACT

A system transmits new workspace elements or new workspace element changes at a first memory store via an electronic network to a second memory store. The system includes a first memory store for storing workspace elements, a second memory store coupled via an electronic network to the first memory store for storing workspace element copies; an interface for receiving new workspace elements at the first memory store; and a general synchronization module for electronically transmitting copies of the new workspace elements via the electronic network to the second memory store.

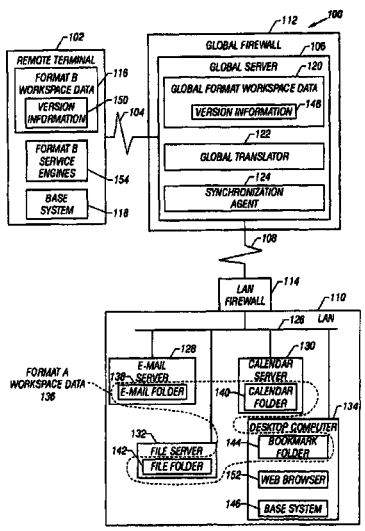

OTHER PUBLICATIONS

Lotus Notes Release 4 Deployment Guide, 1995 Lotus Development Corporation, Cambridge, MA.

Lotus Notes Release 4 Administrator's Guide, 1995 Lotus Development Corporation, Cambridge, MA.

GloMop Group, GloMop: Global Mobile Computing By Proxy, Univ. of Ca. at Berkley (Sep. 1995).

Lambert, M., Pcmail: A Distributed Mail System for Personal Computers, Network Working Group, Jun. 1988.

Mahadev Satyanarayanan, Mobile Information Access, IEEE Personal Communications (Feb. 1996).

Kumar Puneet, Mitigating the Effects of Optimistic Replication in a Distributed File System, Ph.D. Thesis, School of Comp. Sci., Carnegie Mellon Univ. (Dec. 1994).

Kistler, James, Disconnected Operation in a Distributed File System, Ph.D. thesis, Dept. of Comp. Sci., Carnegie Mellon Univ. (May 1993).

U.S. Appl. No. 09/528,363, filed Mar. 17, 2000, Ng et al.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6 are cancelled.

New claims 7-13 are added and determined to be patentable.

7. *A method of synchronizing record entries or changes, comprising:*

*providing a first memory store including a first folder for storing first record entries in a file;*

*using a plurality of first locator modules, each corresponding to a different file format, to identify first memory locations when the first record entries stored in the first memory store include at least two different file formats, the plurality of first locator modules using a system registry corresponding to the first memory store to identify the first record entries;*

*providing a second memory store coupled to the first memory store, the second memory store including a second folder for storing second record entries in a file, the second folder being synchronized with the first folder at a first moment in time such that a content of the second folder is consistent with a content of the first folder at the first moment in time, a format of the content of the first folder being different from a format of the content of the second folder;*

*providing a global server including a third memory store having a third folder for storing third record entries in a file;*

*receiving new first record entries or changes in a file at the first memory store at a second moment in time later than the first moment in time, the first locator module identifying new first memory locations corresponding to the new first record entries or changes using the system registry corresponding to the first memory store; and*

*a general synchronization module for electronically synchronizing the first folder and a third folder in accordance with the identified new first memory locations such that a new third record entry is created in the third folder based on the new first record entires or changes;*

*a synchronization agent for electronically synchronizing the third folder and the second folder such that a new second record entry is created in the second folder based on the new third record entry.*

8. *The method according to claim 7, further comprising:*

*using a plurality of second locator modules, each corresponding to a different file fomat, to identify second memory locations when the second record entries stored in the second memory store include at least two different file formats, the plurality of second locator modules using a system registry corresponding to second memory store to identify the second record entries.*

9. *The method according to claim 7, wherein a format of a content of the third folder includes elements of the format of the content of the first folder and elements of the format of the content of the second folder.*

10. *A system of synchronizing record entries, comprising:*

*a first memory store including a first folder for storing first record entries in a file;*

*a plurality of first locator modules, each corresponding to a different file format, to identify the first memory locations when the first record entries stored in the first memory store include at least two different file formats, the plurality of first locator modules identifying the first memory locations using a system registry corresponding to the first memory store:*

*a second memory store coupled to the first memory store, the second memory store including a second folder for storing second record entries in a file, the second folder being synchronized with the first folder at a first moment in time such that a content of the second folder is consistent with a content of the first folder at the first moment in time;*

*an interface for receiving new record entries in a file at the first memory store, the first locator module identifying new first memory locations corresponding to the new record entries using the system registry corresponding to the first memory store;*

*a general synchronization module for electronically synchronizing the first folder and a third folder in accordance with the identified new first memory locations such that a new third record entry is created in the third folder based on the new first record entries; and*

*a synchronization agent for electronically synchronizing the third folder and the second folder such that a new second record entry is created in the second folder based on the new third record entry, the first, second and third record entries respectively including version and status information.*

11. *The system according to claim 10, further comprising:*

*a plurality of second locator modules, each corresponding to a different file format, to identify second memory locations when the second record entries stored in the second memory store include at least two different file formats, the plurality of second locator modules identifying the second memory locations using a system registry corresponding to the second memory store.*

12. *The method according to claim 10, wherein a format of a content of the third folder includes elements of the format of the content of the first folder and elements of the format of the content of the second folder.*

13. *A system of synchronizing record entries, comprising:*

*first memory means including a first folder for storing first record entries in a file;*

*second memory means coupled to the first memory means, the second memory means including a second folder for storing second file entries in a file, the second folder being synchronized with the first folder at a first moment in time such that a content of the second folder is consistent with a content of the first folder at the first moment in time, formats of the content of the second folder being different from formats of the content of the first folder;* providing a global server including a third memory means having a third folder for storing third record entries in a file;

means for receiving new record file entries or changes at the first memory means;

means for electronically synchronizing the first folder and the third folder such that a new third record entry is created in the third folder based on the new record file entries or changes received at the first memory means; and means for electronically synchronizing the third folder and the second folder, such that a new second record entry is created in the second folder based on the new third record entry a format of a content of the third folder including elements of the format of the content of the first folder and elements of the format of the content of the second folder.

* * * * *